Dec. 2, 1969  KENICHI ODA ET AL  3,481,289
METHOD FOR REMOVING SULFUR DIOXIDE FROM FLUE
GASES OF A COMBUSTION FURNACE
Filed May 13, 1968

Kenichi Oda
Yoshimi Ishihara
INVENTORS

BY Hall, Pollock + Vande Sande
ATTORNEY

United States Patent Office 3,481,289
Patented Dec. 2, 1969

3,481,289
METHOD FOR REMOVING SULFUR DIOXIDE FROM FLUE GASES OF A COMBUSTION FURNACE
Kenichi Oda and Yoshimi Ishihara, Tokyo, Japan, assignors to Central Research Institute of Electric Power Industry, Tokyo, Japan, a foundation organized under the laws of Japan
Filed May 13, 1968, Ser. No. 728,387
Int. Cl. F23b 5/00, 7/00
U.S. Cl. 110—1
5 Claims

ABSTRACT OF THE DISCLOSURE

Sulfur dioxide in the flue gases is effectively removed at a low cost with a simple process by injecting into a combustion furnace hydroxide converted from oxide in calcined limestone, dolomite or a mixture thereof discharged from the furnace together with newly prepared powder of limestone, dolomite or a mixture thereof.

---

This invention relates to a method for removing sulfur dioxide from flue gases of a fuel oil or coal firing furnace, and more particularly it relates to an improved method for removing sulfur dioxide in flue gases of a fuel oil or coal firing furnace by injecting pulverized limestone or dolomite into the furnace.

Removal of sulfur dioxide in flue gases of fuel oil or coal firing furnace has recently been quite desirable from the standpoint of air pollution control.

Although various methods have been proposed, they have not yet been practised because of their need for expensive chemicals and a large apparatus, and their complicated processes. It has been proposed to remove sulfur dioxide from flue gases by injecting pulverized powder of limestone or dolomite into a furnace. This method has such advantages as it is inexpensive and simple, but also has the disadvantage that the rate of sulfur dioxide removal which is important is low.

It is an object of this invention to remove very effectively sulfur dioxide in flue gases from a fuel oil or coal firing furnace at a low cost with a simple process.

Said object of this invention can be attained by a method which comprises injecting into a furnace a hydroxide derived from an oxide in the powder of calcined limestone, dolomite or mixture thereof together with newly prepared powder of limestone, dolomite or a mixture thereof, separating coarse calcined powder of limestone, dolomite or mixture thereof and converting the oxide into hydroxide to reuse them.

Limestone decomposes to produce calcium oxide in a furnace, which reacts with sulfur dioxide and oxygen in accordance with the following equation:

$$CaO + SO_2 + \tfrac{1}{2} O_2 = CaSO_4$$

Change of free energy for said reaction, $\Delta F$, is shown as follows:

$$-\Delta F = 111{,}000 - 56.62 T \text{ (cal.)}$$

Figure 1:
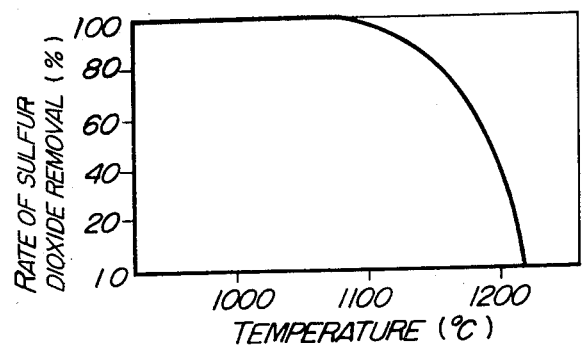

The rate of sulfur dioxide removal when calcium oxide is reacted with flue gases containing 1% of oxygen and 1500 p.p.m. of sulfur dioxide to obtain their equilibrium was calculated in accordance with the above equations and the results thereof are shown in FIG. 1, which indicates that calcium oxide is an effective desulfurization agent which can absorb almost all of sulfur dioxide at 1,000° C.

However, in case of injecting limestone powder into a fuel oil or coal firing furnace, limestone is calcined immediately into calcium oxide due to high temperature in the furnace, but sulfur dioxide cannot be removed effectively, that is, the rate of removal is merely 10–30% because of short contact time of the produced calcium oxide and combustion gases.

A somewhat higher rate of removal is obtained with dolomite powder than with limestone powder. Further, it is also effective to use fine powder of dolomite or limestone. Furthermore, it is more effective to use powder in the form of hydroxide than to use the fine limestone or dolomite powder.

Examination of the difference in composition with regard to the grain size of discharged powder when limestone powder was injected into a furnace yielded the following results.

| Grain size (μ): | CaO, percent | CaSO₄, percent | CaCO₃, percent |
|---|---|---|---|
| 5–10 | 71.5 | 22.4 | 3.2 |
| 8–30 | 74.9 | 18.8 | 3.7 |
| 20–30 | 73.8 | 17.0 | 6.3 |
| 30–60 | 82.4 | 7.0 | 3.8 |

The analysis of the grain size was determined by the observation with a microscope.

From the above, it was found that the coarser the grain size is, the more the unreacted calcium oxide and the less calcium sulfate is.

Although this calcined product discharged from the furnace contains sulfates, it contains oxide as a main component and exhibits some desulfurization effects when injected again into the furnace. However, it was found that when water is added to said calcined product to convert oxide into hydroxide, such produced hydroxide has a high reactivity and removes sulfur dioxide remarkably.

Furthermore, use of an aqueous solution of an iron salt such as ferrous or ferric sulfate and ferrous or ferric chloride as a hydration water results in the improvement of the reactivity of the hydroxide powder. In this case, the proportion of the iron salt added is 0.5–3.0% by weight of the recovered hydroxide powder as an iron oxide.

The desulfurization rates of said various desulfurizing agents when they were applied to a test furnace of 17 cm. in inside diameter and 1,170 cm. in length in which kerosene was burned at 4 l./hr. and into which sulfur dioxide gas was introduced in the concentration of 1,500 p.p.m., are explained as follows (wherein the concentration of oxygen was 8%, the injecting amount of the desulfurization agent was equivalent to sulfur dioxide in the flue gases, and the furnace temperature at the place at which the desulfurization agent was injected into the furnace was adjusted to 1,100° C.):

(1) Powder of limestone which passes through a 300 mesh sieve was used—desulfurization rate 27%.

(2) Precipitated calcium carbonate of 0.5–5μ was used—desulfurization rate 33%.

(3) Dolomite powder which passes through a 150 mesh sieve was used—desulfurization rate 29%.

(4) Commercially available calcium hydroxide which passes through a 150 mesh sieve was used—desulfurization rate 25%.

(5) Powder discharged from the furnace used in said (1) was reused—desulfurization rate 13%.

(6) Hydrate of the discharger product in said (1) was used—desulfurization rate 40%.

(7) Hydrate of discharged dolomite in said (3) was used—desulfurization rate 42%.

From the above, it is clear that the desulfurization rate obtained using hydrate of the discharged powder from the furnace is high.

There is a limit in mechanical pulverization of said ore and the grain size (diameter) of 10μ is the minimum which is industrially obtained. However, hydration of the powder to hydroxide results in the fine powders of several microns. Therefore, when mechanically powdered limestone or dolomite is injected into a furnace together with hydrate of the discharged powder from the furnace in accordance with this invention, there is remarkable difference in the grain size of the calcined product, and separation thereof can easily be carried out. The portion of coarse powder is mainly composed of the mechanically powdered limestone or dolomite, that is, newly prepared powder, main component of which is in the form of oxide.

According to this invention, without using an extra roasting furnace, highly reactive hydrate can be obtained and utilized. Therefore, according to the method of this invention, sulfur dioxide in flue gases from a fuel oil or coal firing furnace can be very effectively and sufficiently removed to prevent the pollution of the air.

When only the hydroxide obtained by hydrating the oxide collected in the dust collector is injected into a furnace, sulfur dioxide can also be removed from combustion gases. However, in the case the method of this invention is applied to an actual boiler to effect continuous injection, merely 50–80% of the injected powder as calcium oxide is collected in the dust collector and a part of other powder deposits in hopper in the boiler or on the heating surfaces and only a part is discharged from a stack. Therefore, in order to maintain the amount of powder to be injected at constant, it is necessary to prepare and supply fresh limestone, dolomite, or a mixture thereof. Further, in order to maintain the reactivity of the hydroxide powder obtained by hydration of recovered oxide at the same as or higher than that of newly prepared powder, it is also necessary to keep the content of unreacted calcium oxide in the recovered oxide at more than 50% by weight. For this purpose, in some cases, a part of oxide powder recovered must be disposed, and the corresponding amount of the powder should be newly prepared and added.

The mixing ratio of the newly prepared powder and the hydroxide of the recovered powder is depending upon:

(a) The objective value of rate of sulfur dioxide removal, and (b) The reactivities of the newly prepared powder and the hydroxide of the recovered powder to sulfur dioxide.

However, practically this ratio may be 3:1–1:2 by weight, which is approximately the same as the rate of the amount of unreacted calcium oxide in the powder.

The examples of this invention are as follows.

EXAMPLE 1

A test furnace comprising a combustion chamber and inverse U-shaped reaction tower of 17 cm. in inside diameter and 1170 cm. in length which stands erect on the furnace was used. In said furnace, kerosene was burned at the rate of 4 l./hr. and sulfur dioxide was introduced into the furnace in such a manner as the concentration of sulfur dioxide was 1,500 p.p.m. Into this combustion gases, limestone powder, 90% of which passed through a 200 mesh sieve was injected in an amount equivalent to sulfur dioxide, namely, at the rate of 400 g./hr. The furnace temperature was adjusted to 1,100° C. at the position of injecting the desulfurization agent and 500° C. at the outlet of the tower. The desulfurization rate in this case was 25% and the compositions of the desulfurization agent collected in a cyclone dust collector provided at the end of the reaction tower were CaO 60.6%, and $CaSO_4$ 36.8%.

EXAMPLE 2

24 grams of water per 100 gr. of desulfurization agent in said dust collector which did not pass through a 325 mesh sieve was added to this desulfurization agent to produce hydrate in a ball mill. After dried, said hydrate in an amount of 250 gr./hr. together with limestone powder 90% of which passed through a 200 mesh sieve in an amount of 400 gr./hr. were injected into the furnace under the same conditions as in Example 1. The desulfurization rate was 55%.

According to the observation with a microscope, the hydrate of the collected powder was finely powdered and was mostly in the range of 3–20μ.

EXAMPLE 3

30 grams of each aqueous solution containing 1 gr. and 3 gr. (as ferric oxide) of ferric sulfate or ferric chloride was added to 100 gr. of powder collected in the dust collector in Example 1 which did not pass through a 325 mesh sieve, respectively, to effect hydration of oxide in the powder in a kneader. Each hydroxide powder was injected into a furnace at a rate of 480 gr/hr.

The desulfurization rate with the powder hydrate with water was 40% as mentioned above. On the other hand, the desulfurization rate with hydroxides to which 1% and 3% of ferric sulfate were added were 45% and 48%, respectively. The desulfurization rate with hydroxide to which 1% and 3% of ferric chloride were added were 47% and 50%, respectively.

EXAMPLE 4

A mixture of 400 gr. of limestone powder whose average grain size was 30μ and 300 gr. of hydroxide of the powder recovered in a dust collector was injected into the test aparatus in Example 1 to obtain the desulfurization rate of 60%. The mixing ratio of newly prepared powder and recovered powder was 1:0.73 by weight and 1.2:1.0 by molar ratio of total CaO in the powders.

When a mixture of 400 gr. of limestone powder and 400 gr. of the hydroxide of the powder recovered in the above experiment was injected into, the desulfurization rate was 64%. In this case, the mixing ratio was 1:1 by weight, 1:0.95 by molar ratio of total CaO in the powders, 1:0.96 by the ratio of unreacted calcium oxide in the powders and 1:1 by the ratio of total calcium oxide in the recovered powder and unreacted calcium oxide.

Figure 2:
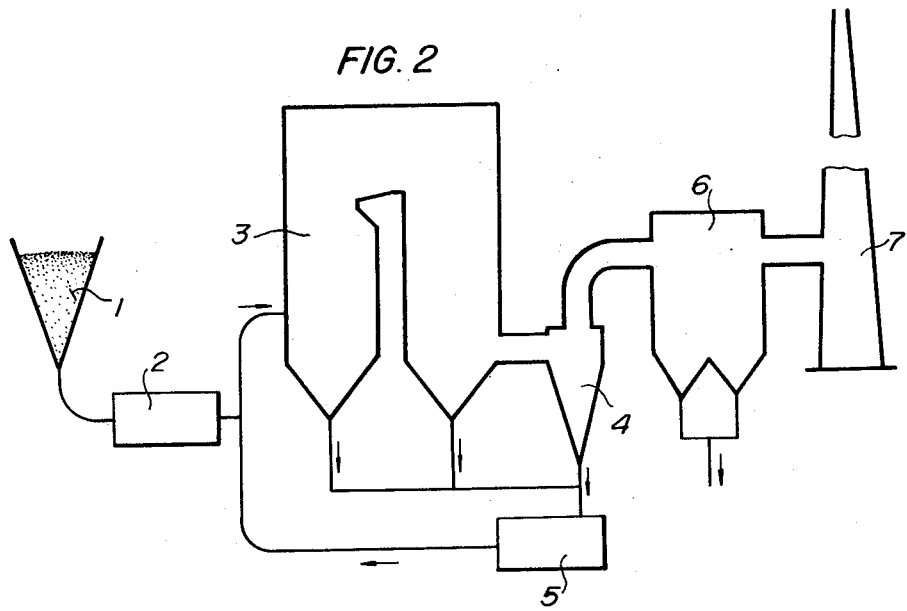

An example of the steps when the method of this invention is applied to an actual boiler is shown in FIG. 2.

In this FIG. 2, 1 is a storage hopper for limestone or dolomite, 2 is a mill, 3 is a fuel oil firing furnace, and 4 is a cylclone dust collector from which coarse powder in the calcined limestone or dolomite included in flue gases is recovered. 5 is a slaker for the calcined limestone or dolomite, in which oxide is converted to hydroxide which is again injected into the furnace. (6) is Cottrell precipitator which removes calcined fine powders contained in the flue gases, thereby to purify the flue gases which are discharged from stack 7 into the atmosphere. The discharged calcined product from Cottrell precipitator is disposed.

The above explanation is given on the use of each limestone and dolomite, but it is apparent that this invention can employ a mixture of limestone and dolomite with the similar results.

Furthermore, the above explanation refers to the removal of sulfur dioxide from flue gases from a fuel oil firing furnace. However, in a coal firing furnace, if this is cyclone combustion type, the hydroxide obtained by hydration of oxide collected in a dust collector can similarly be used for removal of sulfur dioxide in flue gases. It is difficult in a pulverized coal firing method to separate coal ash and calcium oxide collected in a dust collector, but in the cyclone combustion furnace, since coal ash which passes through the furnace is about 30% of total ash matter, the mixture of the coal ash and calcium oxide can be hydrated and recycled for injecting into the furnace without separating the two.

What we claim is:
1. A method for removing sulfur dioxide in flue gases, which comprises injecting into a combustion furnace hydroxides derived from oxides in the calcined product of a member selected from the group consisting of limestone, dolomite, and a mixture thereof together with newly prepared powder of a member selected from the group consisting of limestone, dolomite and a mixture thereof, taking out the coarse powder in the calcined and discharged product of a member selected from the group consisting of limestone, dolomite and a mixture thereof, converting the oxide in said coarse powder to the hydroxide, and reusing the thus obtained hydroxide.

2. A method according to claim 1, wherein the mixing ratio of the newly prepared powder and the hydroxide of the recovered powder is 3:1–1:2 by weight.

3. A method according to claim 1, wherein the combustion furnace into which desulfurizing powder is injected is a fuel oil combustion furnace.

4. A method according to claim 1, wherein the combustion furnace into which the desulfurizing powder is injected is cyclone combustion type coal combustion furnace.

5. A method according to claim 1, wherein the hydration of oxide to hydroxide is effected with a member selected from the group consisting of water, aqueous solution of ferrous or ferric compounds.

References Cited
UNITED STATES PATENTS 3,320,906   5/1967   Domahidy _____ 110—1

FOREIGN PATENTS 878,723   10/1961   Great Britain.

KENNETH W. SPRAGUE, Primary Examiner